Patented June 1, 1926.

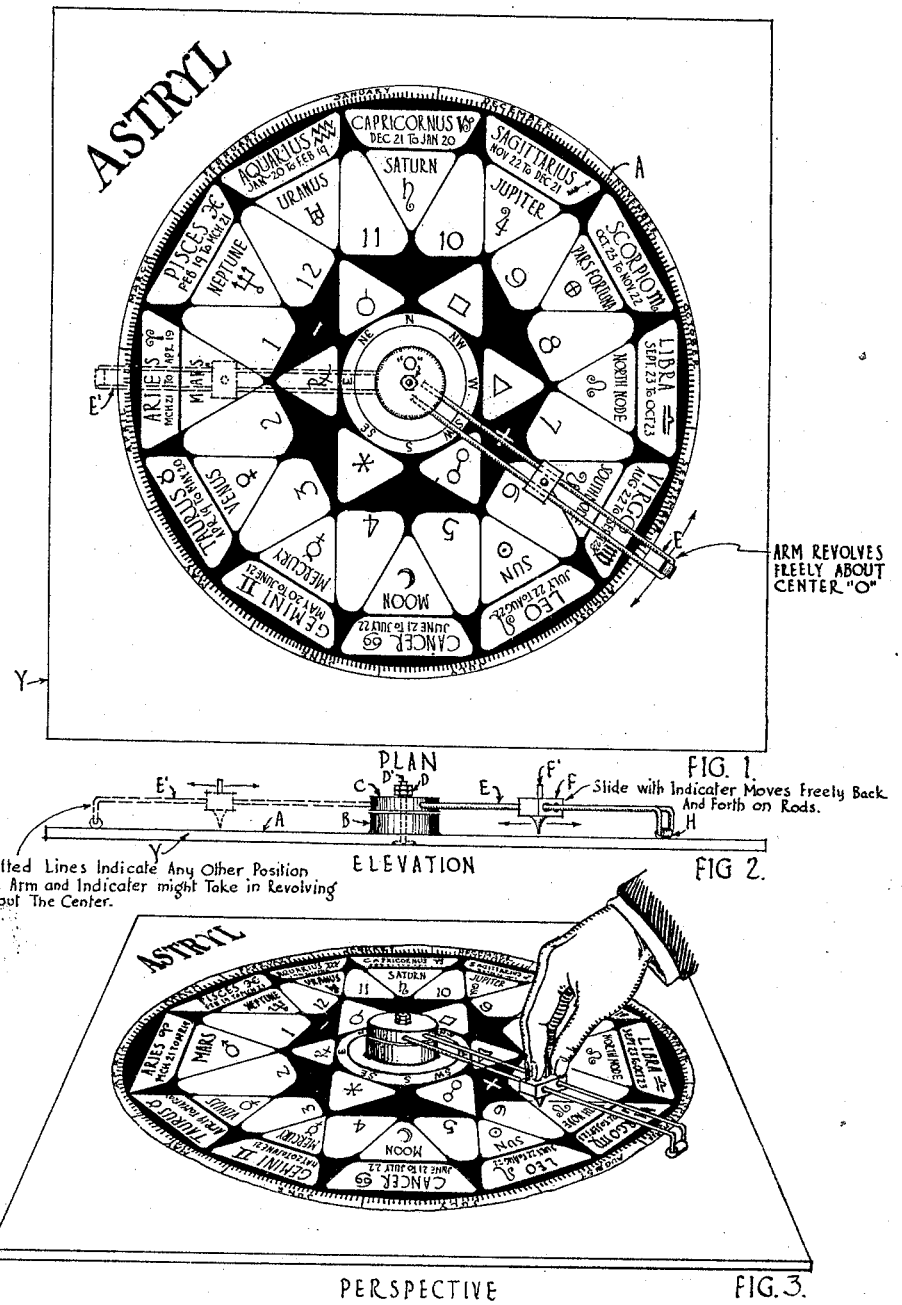

1,587,018

UNITED STATES PATENT OFFICE.

KARL MANAHAN, OF FLUSHING, NEW YORK.

ASTROLOGICAL CHART AND INDICATING DEVICE.

Application filed June 6, 1924. Serial No. 718,395.

This invention relates to fortune telling games, wherein the chart is provided, upon which are arranged astrological signs, symbols, terms, etc. together with an indicating device which is controlled by the involuntary movement of the hand of the operator, in such manner as to point to certain signs, symbols, etc., to indicate communication in answer to questions, or otherwise.

The object of this invention is to provide simple and effective apparatus of this nature. A chart displaying the astrological signs and symbols, etc., together with an indicating device operated by the involuntary action of the hands of the operator, providing a game that can be both entertaining and instructive.

*The drawing.*

In the drawing accompanying and forming a part of this specification similar characters of reference are used throughout, to designate corresponding parts.

Fig. 1 is a top plan view of my device.
Fig. 2 is a side view in elevation thereof.
Fig. 3 is a perspective view of my device as in actual use.

Figure one; a plan view of the astrological device, "A", an exact reproduction of the chart, upon which arranged concentrically are the twelve months of the year, with the number of days therein indicated; the twelve signs of the zodiac; the nine planets considered in astrology; two lunar positions (the north node and the south node); also position known as Pars Fortuna; numbers from one to twelve conclusively to indicate the twelve houses in astrology; the five aspects most commonly employed; the symbol "℞" for retrograde, and the symbol "—" for negative, the symbol "+" for positive; the cardinal points are included also. The arm "E" is free to revolve about the centre "O"; "F" moving freely along arm "E"; "F'" indicator point passing through block "F".

Figure two; side elevation of chart and indicating device, "E", arm of indicator extending from block "C" to outside of chart "A"; "D'" a centre shaft around which indicator arm in block "C" rotates; "B" base on which block "C" rests; "D", lock nuts on centre shaft holding block "C" together with arm "E" in place, allowing free movement of the same; "F" block which moves freely along arm "E"; "F'" indicator point fastened through block "F"; "H" soft pad on indicator arm, permitting same to move over "Y" mounting on which it rests, quietly and without resistance.

It will be seen from the foregoing description that the indicator point, by means of the movements which it has, is free to designate any point or place on the chart, when it is guided by the involuntary action of the hands of the operator. That any number of symbols, characters, numbers, etc., may be designated, which can be recorded and interpreted. In their interpretation, recourse may be had to works on astrology.

It will be understood that any changes in detail of construction may be resorted to without departure from the spirit of the invention.

I claim as new and original, and desire to secure by Letters Patent of the United States.

A game apparatus of the character described; comprising an astrological chart upon which are indicated the twelve signs of the zodiac, the nine planets used in astrology, two lunar positions, (north node, and south node), one position known as Pars Fortuna, numerals from 1 to 12 inclusive, indicating the twelve fold division known as the mundane houses; five of the aspects known to astrology; symbol ℞ for retrograde; symbol + for positive, smybol — for negative; twelve months of the year with the days therein indicated; also the cardinal points of the compass in combination with an indicating device, the arm of which rotates freely about the centre of the chart, and an indicator block and point freely movable along said arm, the movement of said point and arm being caused by the involuntary action of the operator's hands causing said point to indicate any position on said chart, the resulting indications indicating communication in answer to questions or otherwise, in the interpretation of which recourse may be had to works on astrology.

In testimony whereof I affix my signature.

KARL MANAHAN.